(12) United States Patent
Kajiwara et al.

(10) Patent No.: US 11,355,751 B2
(45) Date of Patent: Jun. 7, 2022

(54) AIR ELECTRODE FOR AIR SECONDARY BATTERY AND AIR SECONDARY BATTERY

(71) Applicant: FDK CORPORATION, Tokyo (JP)

(72) Inventors: Takeshi Kajiwara, Tokyo (JP); Shohei Unoki, Tokyo (JP); Takahiro Endo, Tokyo (JP)

(73) Assignee: FDK CORPORATION, Tokyo (JP)

( * ) Notice: Subject to any disclaimer, the term of this patent is extended or adjusted under 35 U.S.C. 154(b) by 254 days.

(21) Appl. No.: 16/665,891

(22) Filed: Oct. 28, 2019

(65) Prior Publication Data

US 2020/0144616 A1   May 7, 2020

(30) Foreign Application Priority Data

Nov. 5, 2018 (JP) ............................. JP2018-208245

(51) Int. Cl.
| | |
|---|---|
| *H01M 4/505* | (2010.01) |
| *H01M 4/24* | (2006.01) |
| *H01M 4/525* | (2010.01) |
| *H01M 12/08* | (2006.01) |
| *H01M 4/38* | (2006.01) |
| *H01M 4/86* | (2006.01) |
| *H01M 4/90* | (2006.01) |
| *H01M 4/02* | (2006.01) |

(52) U.S. Cl.
CPC .......... *H01M 4/505* (2013.01); *H01M 4/242* (2013.01); *H01M 4/383* (2013.01); *H01M 4/525* (2013.01); *H01M 4/8652* (2013.01); *H01M 4/8673* (2013.01); *H01M 4/9016* (2013.01); *H01M 12/08* (2013.01); *H01M 2004/027* (2013.01); *H01M 2004/028* (2013.01)

(58) Field of Classification Search
None
See application file for complete search history.

(56) References Cited

U.S. PATENT DOCUMENTS

2013/0302705 A1* 11/2013 Yoshida ................ H01M 4/921
429/405

FOREIGN PATENT DOCUMENTS

| JP | 2006-196329 | * | 7/2006 |
|---|---|---|---|
| JP | 2006196329 A | | 7/2006 |
| JP | 2015529945 A | | 10/2015 |
| JP | WO2013145468 A1 | | 12/2015 |
| JP | 2017063020 A | | 3/2017 |

* cited by examiner

*Primary Examiner* — Laura Weiner

(74) *Attorney, Agent, or Firm* — Kinney & Lange, P.A.

(57) ABSTRACT

A battery includes an electrode group including an air electrode and a negative electrode stacked with a separator therebetween, and a battery case accommodating the electrode group along with an alkali electrolyte solution, wherein the air electrode includes an air electrode mixture containing a pyrochlore-type composite oxide and a manganese oxide, and the pyrochlore-type composite oxide is a bismuth-ruthenium oxide.

6 Claims, 2 Drawing Sheets

AIR ELECTRODE FOR AIR SECONDARY BATTERY AND AIR SECONDARY BATTERY

CROSS-REFERENCE TO RELATED APPLICATION(S)

This application claims priority to Japanese Application No. 2018-208245 filed on Nov. 5, 2018, which is incorporated by reference in its entirety.

BACKGROUND

Technical Field

The present disclosure relates to an air electrode for an air secondary battery and an air secondary battery.

Description of the Related Art

Air batteries, which use oxygen in air as a positive electrode active material, have attracted attention recently because of their high energy density, compact size, and ease of weight reduction.

With respect to such air batteries, zinc air primary batteries have been put to practical use as the power source for hearing aids.

Further, as rechargeable air batteries, air secondary batteries in which Li, Zn, Al, or Mg is used as negative electrode metal have been studied. Such air secondary batteries are expected to be developed as secondary batteries having an energy density higher than that of lithium ion secondary batteries.

In the air secondary batteries including negative electrode metal described above, however, a dissolution and precipitation reaction of the negative electrode metal is repeated due to a chemical reaction upon charging and discharging batteries (hereinbelow, referred to as a battery reaction). Then, the negative electrode metal is subjected to dendritic growth, in which the metal is dendritically precipitated, problematically leading to internal short-circuiting. Thus, such batteries have not been yet put to practical use.

As one type of air secondary batteries, there has been studied an air hydrogen secondary battery in which an alkaline aqueous solution (alkali electrolyte solution) is used as the electrolyte solution and hydrogen is used as the negative electrode active material (e.g., see Japanese Patent No. 4568124). In air hydrogen secondary batteries as represented by Japanese Patent No. 4568124, despite use of a hydrogen storage alloy as the negative electrode metal, the negative electrode active material is hydrogen, which is absorbed to and released from this hydrogen storage alloy. Thus, no dissolution and precipitation reaction of the hydrogen storage alloy itself occurs due to a battery reaction, and the problem of internal short-circuiting caused by dendritic growth described above is not generated.

In an air secondary battery in which an alkali electrolyte solution is used as in the air hydrogen secondary battery described above, a charge and discharge reaction as shown below occurs in the positive electrode (hereinbelow, referred to as the air electrode), Charge(oxygen evolution reaction): $4OH^- \rightarrow O_2 + 2H_2O + 4e^-$   (I)

Discharge(oxygen reduction reaction): $O_2 + 2H_2O + 4e^- \rightarrow 4OH^-$   (II)

The air electrode in the air secondary battery produces oxygen and water on charging, as represented by the reaction formula (I) and reduces oxygen to produce hydroxide ions on discharging, as represented by the reaction formula (II). Oxygen generated in the air electrode is released into the atmosphere from the portion open to the atmosphere in the air electrode.

In the air secondary battery described above, the energy efficiency has not yet reached a sufficient value, and sufficient high output has not yet been achieved. For this reason, in order to put air secondary batteries into practical use, further improvement in the energy efficiency and high output are required.

One of factors preventing the further improvement in the energy efficiency and high output described above is large overvoltage of the discharge reaction, that is, the oxygen reduction reaction, in the air electrode.

SUMMARY

According to the present disclosure, an air electrode for an air secondary battery is provided, including an air electrode mixture containing a pyrochlore-type composite oxide and a manganese oxide, wherein the pyrochlore-type composite oxide has a composition represented by the general formula: $A_{2-x}B_{2-y}O_{7-z}$, wherein x, y, and z each represent a numerical value of 0 or more and 1 or less, A represents at least one element selected from Bi, Pb, Tb, La, Ce, Pr, Nd, Pm, Sm, Eu, Gd, Dy, Ho, Er, Tm, Yb, Lu, Mn, Y, Zn, and Al, and B represents at least one element selected from Ru, Ir, Si, Ge, Ta, Sn, Hf, Zr, Ti, Nb, V, Sb, Rh, Cr, Re, Sc, Co, Cu, In, Ga, Cd, Fe, Ni, W, and Mo.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein.

DETAILED DESCRIPTION

Hereinbelow, an air hydrogen secondary battery 1 (hereinbelow, referred to as the battery 1) incorporating an air electrode for an air secondary battery according to the present disclosure will be described with reference to the drawings.

Figure 1:
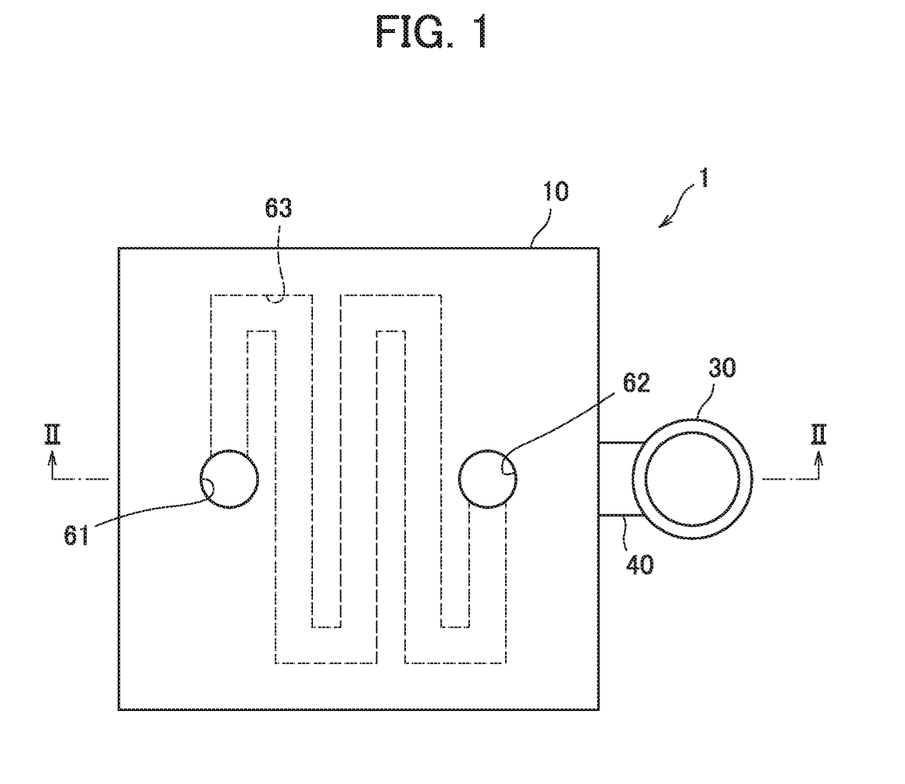
FIG. 1 is a schematic plan view of an air hydrogen secondary battery according to an embodiment of the present disclosure.
Figure 2:
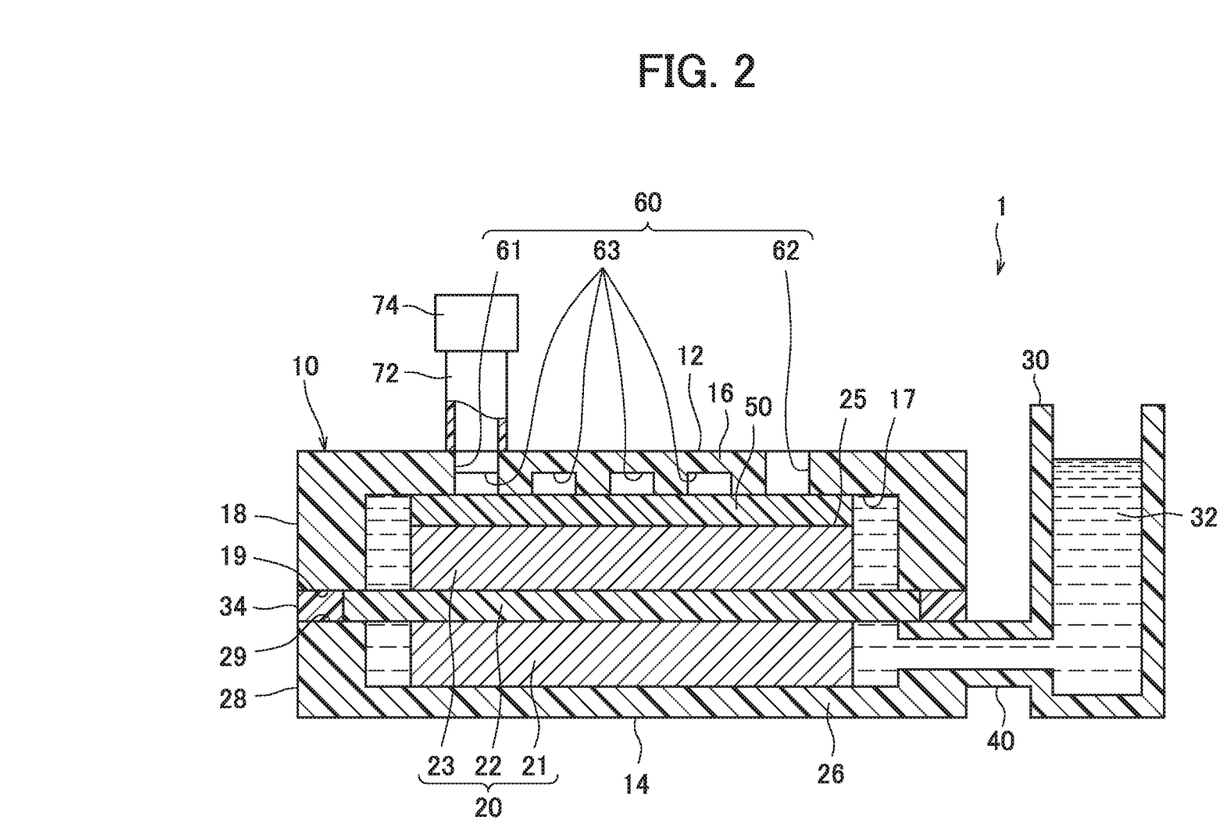
FIG. 2 is a cross-sectional view showing a cross-section taken along line II-II in FIG. 1.

The battery 1 includes a battery case 10 as a container, as shown in FIG. 1. This battery case 10 includes an air electrode-side case half 12 and a negative electrode-side case half 14, as shown in FIG. 2. The air electrode-side case half 12 and the negative electrode-side case half 14 are combined to form the box-shaped battery case 10 as a whole. This battery case 10 is formed of an acrylic resin, for example.

The air electrode-side case half 12 includes a wall opposed to air electrode 16, which is opposed to an air electrode 23, and an air electrode-side outer peripheral wall 18, which is provided on the peripheral portion of this wall opposed to air electrode 16 and surrounding the air electrode 23.

The negative electrode-side case half 14 includes a negative electrode-side opposed wall 26 in contact with a negative electrode 21 and a negative electrode-side outer peripheral wall 28, which is provided on the peripheral portion of this negative electrode-side opposed wall 26 and surrounding the negative electrode 21.

An electrode group 20, along with an alkali electrolyte solution 32, is accommodated inside the battery case 10.

The electrode group 20 is formed by stacking the air electrode (positive electrode) 23 on the negative electrode 21 with a separator 22 therebetween.

The negative electrode 21 includes a conductive negative electrode substrate that forms a porous structure and has a large number of pores and a negative electrode mixture supported inside the pores and the surface of the negative electrode substrate. As the negative electrode substrate described above, foam nickel can be used, for example.

A negative electrode mixture includes a hydrogen storage alloy powder, which is an assembly of hydrogen storage alloy particles that can absorb and release hydrogen, as a negative electrode active material, a conductive material, and a binder. Here, as the conductive material, graphite, carbon black, or the like can be used.

As the hydrogen storage alloy constituting the hydrogen storage alloy particles, which is not particularly limited, a rare earth-Mg—Ni-based hydrogen storage alloy is used. The composition of this rare earth-Mg—Ni-based hydrogen storage alloy can be optionally selected. For example, one represented by the general formula:

$$Ln_{1-a}Mg_aNi_{b-c-d}Al_cM_d \quad \text{(III)}$$

is preferably used.

In general formula (III), Ln represents at least one element selected from the group consisting of La, Ce, Pr, Nd, Pm, Sm, Eu, Gd, Tb, Dy, Ho, Er, Tm, Yb, Lu, Sc, Y, Zr, and Ti, M represents at least one element selected from the group consisting of V, Nb, Ta, Cr, Mo, Mn, Fe, Co, Ga, Zn, Sn, In, Cu, Si, P, and B, subscripts a, b, c, and d respectively represent a number satisfying $0.01 \leq a \leq 0.30$, $2.8 \leq b \leq 3.9$, $0.05 \leq c \leq 0.30$, and $0 \leq d \leq 0.50$.

Hydrogen storage alloy particles are obtained as follows, for example.

First, metal raw materials are weighed to achieve a predetermined composition and mixed. This mixture is dissolved under an inert gas atmosphere in a high-frequency induction melting furnace, for example, to form an ingot. The ingot obtained is heated to 900 to 1200° C. under an inert gas atmosphere. The ingot is subjected to a thermal treatment at this temperature for 5 to 24 hours and thus homogenized. Thereafter, this ingot is pulverized and sieved to thereby obtain a hydrogen storage alloy powder, which is an assembly of hydrogen storage alloy particles having a desired particle size.

Examples of a binder to be used include sodium polyacrylate, carboxymethyl cellulose, and styrene butadiene rubber.

The negative electrode 21 here can be produced as follows, for example.

First, a hydrogen storage alloy powder, which is an assembly of hydrogen storage alloy particles, a conductive material, a binder, and water are kneaded to prepare a negative electrode mixture paste. The negative electrode mixture paste obtained is packed into a negative electrode substrate and then subjected to a drying treatment. After drying, the negative electrode substrate having the hydrogen storage alloy particles and the like attached thereto is rolled to increase the alloy content per volume. Thereafter, the rolled substrate is cut to thereby produce the negative electrode 21. This negative electrode 21 is in a plate form as a whole.

Next, the air electrode 23 includes a conductive air electrode substrate that forms a porous structure and has a large number of pores and an air electrode mixture (positive electrode mixture) carried inside the pores and the surface of the air electrode substrate. As the air electrode substrate described above, foam nickel or nickel mesh can be used, for example.

The air electrode mixture includes a catalyst for an air secondary battery, a manganese oxide, a conductive material, and a binder.

As the catalyst for an air secondary battery, a pyrochlore-type composite oxide is used. Here, as the pyrochlore-type composite oxide, a pyrochlore-type composite oxide having a composition represented by the general formula: $A_{2-x}B_{2-y}O_{7-z}$, wherein x, y, and z each represent a numerical value of 0 or more and 1 or less, A represents at least one element selected from Bi, Pb, Tb, La, Ce, Pr, Nd, Pm, Sm, Eu, Gd, Dy, Ho, Er, Tm, Yb, Lu, Mn, Y, Zn, and Al, and B represents at least one element selected from Ru, Ir, Si, Ge, Ta, Sn, Hf, Zr, Ti, Nb, V, Sb, Rh, Cr, Re, Sc, Co, Cu, In, Ga, Cd, Fe, Ni, W, and Mo, is preferably used. More preferably, a bismuth-ruthenium oxide is used. This bismuth-ruthenium oxide, which is one of pyrochlore-type composite oxides, is a catalyst having dual functions: oxygen generation and oxygen reduction. Such a catalyst having dual functions contributes to reduction in overvoltage of a battery both in the charging process and discharging process.

In respect of a method for producing a catalyst for an air secondary battery, a pyrochlore-type bismuth-ruthenium oxide, as an example, will be specifically described below.

$Bi(NO_3)_3 \cdot 5H_2O$ and $RuCl_3 \cdot 3H_2O$ were introduced at the same concentration into distilled water and stirred to prepare a mixed aqueous solution of $Bi(NO_3)_3 \cdot 5H_2O$ and $RuCl_3 \cdot 3H_2O$. The temperature of the distilled water at this time is set at 60° C. or more and 90° C. or less. Then, a 1 mol/L or more and 3 mol/L or less NaOH aqueous solution is added to this mixed aqueous solution. While the bath temperature at this time is maintained at 60° C. or more and 90° C. or less, the solution is stirred under oxygen bubbling. While the solution containing a precipitate generated by this operation is maintained at 80° C. or more and 100° C. or less, a portion of the moisture is evaporated to form a paste. This paste is transferred to an evaporating dish and heated to 100° C. or more and 150° C. or less. The paste is dried while maintained in the state for 10 hours or more and 20 hours or less to obtain a dried product of the paste. After being pulverized in a mortar, this dried product is heated under an air atmosphere to 500° C. or more and 700° C. or less. The dried product is calcined while maintained for 0.5 hours or more and 24 hours or less to obtain a calcined product. The calcined product obtained is washed with distilled water at 60° C. or more and 90° C. or less and then dried. This results in a pyrochlore-type bismuth-ruthenium oxide.

Subsequently, the bismuth-ruthenium oxide prepared is subjected to an acid treatment, wherein the oxide is immersed in a nitric acid aqueous solution. The treatment is specifically as follows.

First, a nitric acid aqueous solution is provided. Here, the concentration of the nitric acid aqueous solution is preferably 1 mol/L or more and 3 mol/L or less. The amount of the nitric acid aqueous solution to be provided is preferably 20 mL per 1 g of a bismuth-ruthenium oxide. The temperature of the nitric acid aqueous solution is preferably set at 20° C. or more and 25° C. or less.

Then, in the nitric acid aqueous solution provided, the bismuth-ruthenium oxide is immersed and stirred for 0.5 hours or more and 2 hours or less. After a predetermined time period elapses, the bismuth-ruthenium oxide is filtered with suction from the nitric acid aqueous solution. The bismuth-ruthenium oxide filtered is introduced in and washed with ion exchanged water set at 60° C. or more and 80° C. or less.

The washed bismuth-ruthenium oxide is subjected to a drying treatment while maintained under an environment of 100° C. or more and 120° C. or less for 1 hours or more and 2 hours or less.

In the manner as mentioned above, the bismuth-ruthenium oxide subjected to the acid treatment is obtained. Applying the acid treatment as mentioned above enables removal of by-products generated during the production process of the bismuth-ruthenium oxide (pyrochlore-type composite oxide). Note that the acidic aqueous solution used in the acid treatment is not limited to nitric acid aqueous solutions and hydrochloric acid aqueous solution and sulfuric acid aqueous solution can be used in addition to nitric acid aqueous solutions. In these hydrochloric acid aqueous solutions and sulfuric acid aqueous solutions, an effect of enabling by-products to be removed can be provided as in the case of nitric acid aqueous solutions.

Next, a manganese oxide will be described. The present inventors have found that incorporation of both a pyrochlore-type composite oxide and a manganese oxide in an air electrode mixture leads to reduction in the discharge overvoltage and particularly can achieve high output in respect of an air secondary battery to be obtained. Based on this finding, the present inventors have allowed the air electrode mixture to contain a manganese oxide.

Here, the electrochemical reductive mechanism of oxygen in an alkali electrolyte solution includes a two-electron reduction pathway represented by the following formula (IV), in addition to the direct four-electron reduction pathway represented by the formula (II) described above. This two-electron reduction pathway is known to proceed on the surface of carbon and generate a hydrogen peroxide ion ($HO_2^-$) as an intermediate.

$$O_2 + H_2O + 2e^- \rightarrow HO_2^- + OH^- \tag{IV}$$

$HO_2^-$, when carbon is present in an air electrode, corrodes the carbon and additionally adsorbs to the electrode surface to prevent the reaction. Thus, $HO_2^-$ adversely affects the battery reaction and causes increase in overvoltage of the battery.

The present inventors have attempted to reduce discharge overvoltage by employing an aspect in which no carbon is used in the conductive material and no $HO_2^-$ is generated. However, a sufficient effect of reducing discharge overvoltage has not been achieved. This is related with the fact that the pyrochlore-type composite oxide catalyst is in a diffusion controlled state in which oxygen and water are not sufficiently supplied to reaction points in the catalyst layer particularly at a high rate discharge, and $HO_2^-$ has been conceived to be generated when no carbon is present. Then, when a manganese oxide capable of decomposing $HO_2^-$ is added to the air electrode mixture, the discharge voltage has decreased, and high power has been achieved.

That is, the manganese oxide is conceived to serve as a catalyst that decomposes $HO_2^-$ and to allow the reaction of the following formula (V) to proceed.

$$2HO_2^- \rightarrow 2OH^- + O_2 \tag{V}$$

From the formulas (IV) and (V) described above, the whole reaction will be the same as that of the formula (II).

In the present disclosure, the pyrochlore-type composite oxide functions as a catalyst having dual functions: oxygen generation and oxygen reduction, and the manganese oxide functions as a catalyst that contributes only to decomposition of $HO_2^-$ as an intermediate product on discharging. In order to efficiently carry out these functions, it is preferable that the mass ratio between the manganese oxide and the pyrochlore-type composite oxide in the air electrode mixture have the following relations.

That is, the relations of $Q+R=100\%$, $5\% \leq Q \leq 50\%$, and $50\% \leq R \leq 95\%$ are preferably satisfied where Q represents the mass ratio of the manganese oxide and R represents the mass ratio of the pyrochlore-type composite oxide. More preferably, the Q and the R satisfy the relations of $Q+R=100\%$, $10\% \leq Q \leq 20\%$, and $80\% \leq R \leq 90\%$.

The crystal structure and valence of the manganese oxide described above are not particularly limited, and examples of the manganese oxide include $MnO_2$, $Mn_2O_3$, and $Mn_3O_4$. Here, examples of the $MnO_2$ described above include at least one of $\alpha$-$MnO_2$, $\beta$-$MnO_2$, $\gamma$-$MnO_2$, $\lambda$-$MnO_2$, and $\delta$-$MnO_2$, which have a crystal form of $\alpha$-form, $\beta$-form, $\gamma$-form, $\lambda$-form, and $\delta$-form, respectively. Examples of the $Mn_2O_3$ described above include at least one of $\alpha$-$Mn_2O_3$ and $\gamma$-$Mn_2O_3$, which have a crystal form of $\alpha$-form and $\gamma$-form, respectively.

As methods for synthesizing the manganese oxide described above, two types of methods may be employed: an electrolysis method and a chemical method, but there is no particular limitation to either of the methods. However, it is desirable that the manganese oxide be uniformly dispersed in the air electrode mixture to extend the reaction surface area. For this reason, $\gamma$-$MnO_2$, which is obtained by the electrolysis method capable of synthesizing fine particles having high specific surface area, and $\beta$-$MnO_2$, $\alpha$-$Mn_2O_3$, and $Mn_3O_4$, which are obtained by calcining this $\gamma$-$MnO_2$ are employed as preferable ones.

Note that, as the manganese oxide to be added in the air electrode mixture, at least one of the manganese oxides described above is preferably added.

Next, the conductive material will be described. This conductive material is employed as a support for the catalyst described above, in order to reduce the internal resistance for the purpose of achieving high power of the air secondary battery. In the present disclosure, use of carbon as the conductive material for the air electrode is avoided due to concerns over corrosion of carbon caused by $HO_2^-$ as an intermediate product on the discharge reaction and corrosion of carbon caused by electrolysis oxidation on charging. For this reason, a nickel powder, which is an assembly of nickel particles, is preferably used as the conductive material in the present disclosure. As the nickel powder, a nickel powder formed by filamentary nickel particles is preferably used. Here, filamentary refers to a fine thread-like structure. As the nickel particles described above, particles having an average particle size of 0.1 μm to 10 μm, for example, are preferably used. Here, in the present disclosure, the average particle size refers to a volume average particle size obtained by measuring the average particle size on a volume basis of a powder, which is an assembly of particles to be targeted, by a laser diffraction-scattering particle size distribution analyzer.

In the air electrode mixture, 60% by mass or more of the nickel powder described above is preferably contained. The upper limit of the content of the nickel powder is preferably 80% by mass or less, in connection with the other constituents in the air electrode mixture.

The conductive material is not limited to the nickel powder described above, and a metal-coated conductive filler, which is a core material coated with a metal material, also can be used. This metal-coated conductive filler, which is lighter than metal particles entirely formed by a metal, contributes to weight reduction of the entire air electrode. Examples of the core material described above include, but are not particularly limited to, silica particles. Then, as the metal-coated layer, nickel is preferably employed. In the air electrode mixture, 30% by mass or more of a metal-coated conductive filler powder, which is an assembly of such a metal-coated conductive filler, is preferably contained.

The binder binds the constituents of the air electrode mixture to each other, and additionally serves to impart suitable water repellency to the air electrode 23. Here, examples of the binder include, but are not particularly limited to, fluorine resins. Note that, as a preferable fluorine resin, polytetrafluoroethylene (PTFE) is used, for example.

The air electrode 23 can be produced as follows, for example.

First, prepared is an air electrode mixture paste including a bismuth-ruthenium oxide, a manganese oxide, a conductive material, a binder, and water.

The air electrode mixture paste obtained is shaped into a sheet form, and then is pressure-bonded by a press onto nickel mesh (an air electrode substrate). Thereby, an intermediate product for an air electrode is obtained.

The intermediate product obtained is then introduced in a calciner and subjected to a calcining treatment. This calcining treatment is carried out under an inert gas atmosphere. As this inert gas, nitrogen gas or argon gas is used, for example. As the calcining treatment conditions, the intermediate product is heated to a temperature of 300° C. or more and 400° C. or less and maintained in this state for 10 minutes or more and 20 minutes or less. Thereafter, the intermediate product is naturally cooled in the calciner and taken out in the atmosphere when the temperature of the intermediate product is lowered to 150° C. or less. Thereby, obtained is an intermediate product subjected to the calcining treatment. The air electrode 23 is obtained by cutting the intermediate product after this calcining treatment into a predetermined shape.

The air electrode 23 obtained as described above and the negative electrode 21 are stacked with the separator 22 therebetween to thereby form the electrode group 20. This separator 22 is provided to prevent short-circuiting between the air electrode 23 and the negative electrode 21, and an electrically insulating material is employed therefor. As the material employed for this separator 22, non-woven fabric of polyamide fibers to which hydrophilic functional groups are imparted, and non-woven fabric of polyolefin fibers such as polyethylene and polypropylene to which hydrophilic functional groups are imparted can be used. Here, the separator 22 is in a rectangular form as a whole. The shape of the separator 22 in the plan view is preferably larger than the shape of the air electrode 23 described above in the plan view and the shape of the negative electrode 21 in the plan view.

When the electrode group 20 is formed, the electrode group 20 is assembled such that the four ends of the separator 22 overhang the four ends of the air electrode 23 and the negative electrode 21.

In the electrode group 20 obtained, a water-repellent venting member 50 is preferably further mounted on the air electrode 23. This water-repellent venting member 50 is not particularly limited as long as the member has a function of allowing air to permeate therethrough and preventing an alkali electrolyte solution from permeating therethrough. As such a water-repellent venting member 50, for example, a fluorine resin porous film is preferably used. More preferably a PTFE porous film is used. Further, as the water-repellent venting member 50, preferably used is a composite obtained by stacking non-woven fabric diffusion paper on a fluorine resin porous film.

The electrode group 20 onto which the water-repellent venting member 50 is mounted is provided in the battery case 10. In detail, as shown in FIG. 2, the electrode group 20 onto which the water-repellent venting member 50 is sandwiched between the wall opposed to air electrode 16 of the air electrode-side case half 12 and the negative electrode-side opposed wall 26 of the negative electrode-side case half 14 as well as the four ends of the separator 22 are sandwiched between the tip 19 of the air electrode-side outer peripheral wall 18 of the air electrode-side case half 12 and the tip 29 of the negative electrode-side outer peripheral wall 28 of the negative electrode-side case half 14 to thereby fix the electrode group 20. Thereby, the battery 1 is formed.

Here, the gap between the tip 19 of the air electrode-side outer peripheral wall 18 of the air electrode-side case half 12 and the tip 29 of the negative electrode-side outer peripheral wall 28 of the negative electrode-side case half 14 is sealed with a packing 34 such that the alkali electrolyte solution 32 does not leak from the ends of the separator 22 to outside the battery case 10.

The negative electrode-side case half 14 includes an electrolyte solution storage 30 attached via a connecting portion 40 to a portion of the negative electrode-side outer peripheral wall 28. The electrolyte solution storage 30 is a container accommodating the alkali electrolyte solution 32. The connecting portion 40 is a fluid passage for the alkali electrolyte solution 32 that provides communication between inside the battery case 10 and the electrolyte solution storage 30. As the inside of the battery case 10 is in communication with the electrolyte solution storage 30 in this manner, the alkali electrolyte solution 32 can move between inside the battery case 10 and the electrolyte solution storage 30. For this reason, when the air electrode 23 produces water on charging to increase the amount of the alkali electrolyte solution 32, an excess of the alkali electrolyte solution 32 inside the battery case 10 is transferred to and stored in the electrolyte solution storage 30. In contrast, when the air electrode 23 decomposes water on discharging to reduce the alkali electrolyte solution 32, the alkali electrolyte solution 32 stored in the electrolyte solution storage 30 can be transferred to inside the battery case 10 to thereby to compensate for the lack of the alkali electrolyte solution 32 in the air electrode 23. As described above, providing the electrolyte solution storage 30 can reduce leakage and depletion of the alkali electrolyte solution 32.

Note that, as the alkali electrolyte solution 32 described above, common alkali electrolyte solutions for use in alkali secondary batteries are suitably used, and specifically, aqueous solutions containing at least one of NaOH, KOH, and LiOH as a solute are used.

The air electrode-side case half 12 also has a venting passage 60. The venting passage 60 supplies oxygen in air to the air electrode 23 on discharging as well as releases oxygen generated from the air electrode 23 to the outside on charging. The shape of the venting passage 60 is not particularly limited. Examples of the preferable shape of the venting passage 60 include shapes shown in FIG. 1 and FIG. 2. That is, the venting passage 60 includes a recessed groove 63, as an air electrode opening, provided on an air electrode-side inner wall surface 17 in the wall opposed to air electrode 16, a first vent 61 provided at one end of the recessed groove 63, and a second vent 62 provided at the other end of the recessed groove 63.

The shape of the recessed groove 63 in the plan view, as seen from FIG. 1, is one serpentine shape as a whole, and the cross-sectional shape of the recessed groove 63, as seen from FIG. 2, is a rectangular shape, which is open to the side of the air electrode 23 (the side of the water-repellent venting member 50). The number of turns of the serpentine shape is not particularly limited.

The first vent 61 is a through hole penetrating from the inside to the outside of the wall opposed to air electrode 16 at a portion at one end of the recessed groove 63. Then, a portion of the inner peripheral surface of the first vent 61 is in communication with the recessed groove 63.

The second vent 62 is a through hole penetrating from the inside to the outside of the wall opposed to air electrode 16 at a portion at the other end of the recessed groove 63. Then, a portion of the inner peripheral surface of the second vent 62 is in communication with the recessed groove 63.

The water-repellent venting member 50 described above intervenes between the wall opposed to air electrode 16 and the air electrode 23 and is in a close contact with both of the wall opposed to air electrode 16 and air electrode 23. This water-repellent venting member 50 has a size sufficient to entirely cover the recessed groove 63, the first vent 61, and the second vent 62.

In the battery 1 of an aspect as described above, air flows through the venting passage 60. The air flowing through the venting passage 60 diffuses inside the water-repellent venting member 50, which faces the recessed groove 63 of the venting passage 60. Then, the water-repellent venting member 50 allows the air that has diffused to the inside to permeate the air electrode 23, which is positioned immediately below and in contact with the member 50. That is, the water-repellent venting member 50 functions as a gas diffusion layer. The water-repellent venting member 50 also allows oxygen generated from the air electrode 23 to permeate to the recessed groove 63. The oxygen that has reached the recessed groove 63 is released through a vent to the atmosphere outside the battery case 10.

The alkali electrolyte solution 32 inside the battery case 10 is prevented from permeating the venting passage 60 by the water-repellent venting member 50. For this reason, when the pressure of the alkali electrolyte solution 32 inside the battery case 10 increases, it is possible to inhibit leakage of the alkali electrolyte solution 32 through the vent to the outside.

Here, in the battery 1 according to the present disclosure, a pressure pump 74 as a pressure apparatus is attached via a piping member 72 to the first vent 61. Driving this pressure pump 74 enables feeding air from the first vent 61 to the recessed groove 63.

In the present embodiment, although not shown, an air electrode lead is electrically connected to the air electrode 23 and a negative electrode lead is electrically connected to the negative electrode 21. These air electrode lead and negative electrode lead appropriately extend from the inner side to the outside of the battery case 10 while air-tightness and water-tightness of the battery case 10 is maintained. Additionally, an air electrode terminal is attached to the tip of the air electrode lead, and a negative electrode terminal is attached to the tip of the negative electrode lead. Accordingly, in the battery 1, the air electrode terminal and negative electrode terminal are used to input and output electric currents on charging and discharging.

In FIG. 1, the pressure pump 74 is not shown.

Here, in the battery 1, the recessed groove 63 of the air electrode-side case half 12 is opposite to the water-repellent venting member 50. The water-repellent venting member 50 allows gas to permeate therethrough but blocks moisture, and thus the air electrode 23 is open to the atmosphere via the water-repellent venting member 50, the recessed groove 63, the first vent 61, and the second vent 62. That is, the air electrode 23 is brought into contact with the atmosphere through the water-repellent venting member 50.

The air electrode catalyst for an air secondary battery as described above can contribute to reduction in overvoltage in a discharge reaction. Thus, an air secondary battery including the air electrode catalyst can reduce overvoltage in a discharge reaction to thereby improve the energy efficiency and achieve high output.

EXAMPLES

1. Production of Battery

Example 1

(1) Catalyst Synthesis

As a first step, a predetermined amount of $Bi(NO_3)_3 \cdot 5H_2O$ and $RuCl_3 \cdot 3H_2O$ was provided. These $Bi(NO_3)_3 \cdot 5H_2O$ and $RuCl_3 \cdot 3H_2O$ were introduced at the same concentration into distilled water at 75° C. and stirred to prepare a mixed aqueous solution of $Bi(NO_3)_3 \cdot 5H_2O$ and $RuCl_3 \cdot 3H_2O$. Then, a 2 mol/L NaOH aqueous solution was added to this mixed aqueous solution. The bath temperature at this time was set at 75° C., and the solution was stirred under oxygen bubbling. While the solution containing a precipitate generated by this operation was maintained at 85° C., a portion of the moisture was evaporated to form a paste. This paste was transferred to an evaporating dish and heated to 120° C. This paste was dried while maintained in the state for 12 hours to obtain a dried product of the paste (precursor). Then, as a second step, this dried product was pulverized in a mortar then heated under an air atmosphere to 600° C., calcined while maintained for 1 hour to obtain a calcined product. The calcined product obtained was washed with distilled water at 70° C., then filtered with suction, and dried at 120° C. This resulted a pyrochlore-type bismuth-ruthenium oxide ($Bi_2Ru_2O_7$).

The bismuth-ruthenium oxide obtained was pulverized using a mortar to obtain a bismuth-ruthenium oxide powder, which was an assembly of particles having a predetermined particle size. As a result of observation on a secondary electron image of this bismuth-ruthenium oxide powder obtained using a scanning electron microscope, the bismuth-ruthenium oxide had a particle size of 0.1 μm or less.

Subsequently, as a third step, 2 g of the bismuth-ruthenium oxide powder, along with 40 mL of nitric acid aqueous solution, was placed in the stirring tank of a stirrer and stirred for 6 hours while the temperature of the nitric acid aqueous solution was maintained at 25° C. Here, the concentration of the nitric acid aqueous solution was set at 2 mol/L.

After the stirring was completed, the bismuth-ruthenium oxide powder was taken out from the nitric acid aqueous solution by filtering with suction. The bismuth-ruthenium oxide powder taken out was washed with 1 liter of ion exchanged water heated to 70° C. After washing, the bismuth-ruthenium oxide powder was placed in a reduced pressure vessel at room temperature of 25° C. and maintained under a reduced pressure environment for 12 hours. Thereby, the bismuth-ruthenium oxide powder was dried.

In the manner as mentioned above, obtained was a bismuth-ruthenium oxide powder subjected to a nitric acid-treatment, that is, a catalyst for an air secondary battery.

(2) Production of Air Electrode

Provided was a manganese dioxide($\gamma$-$MnO_2$) powder produced by an electrolysis. This $\gamma$-$MnO_2$ had an average particle size of 40 μm.

A nickel powder as an assembly of nickel particles was also provided. This nickel particles were filamentary and had an average particle size of 2 to 3 μm.

A polytetrafluoroethylene (PTFE) dispersion and ion exchanged water were further provided.

To the bismuth-ruthenium oxide powder obtained in the manner described above, the $\gamma$-$MnO_2$ powder, nickel powder, polytetrafluoroethylene (PTFE) dispersion, and ion exchanged water provided were mixed. At this time, the bismuth-ruthenium oxide powder in an amount of 19 parts by mass, the $\gamma$-$MnO_2$ powder in an amount of 1 part by mass, the nickel powder in an amount of 70 parts by mass, the PTFE dispersion in an amount of 10 parts by mass, and the ion exchanged water in an amount of 30 parts by mass were uniformly mixed to produce an air electrode mixture paste.

The air electrode mixture paste obtained was shaped into a sheet form. This air electrode mixture paste in a sheet form was pressure-bonded by a press onto nickel mesh having a mesh number of 60, a wire diameter of 0.08 mm, and an opening ratio of 60%.

The air electrode mixture paste pressure-bonded on the nickel mesh was heated to 340° C. under a nitrogen gas atmosphere and calcined while maintained at this temperature for 13 minutes. The sheet calcined of the air electrode mixture was cut to a size of 40 mm in length and 40 mm in width to thereby obtain an air electrode 23. The air electrode 23 had a thickness of 0.30 mm. In the air electrode 23 obtained, the amount of the bismuth-ruthenium oxide powder (pyrochlore-type composite oxide catalyst) was 0.34 g.

(3) Production of Negative Electrode

Metal materials of Nd, Mg, Ni, and Al were mixed at a predetermined molar ratio, then introduced in a high-frequency induction melting furnace, and melted under an argon gas atmosphere. The melted metal obtained was poured into a mold and cooled to room temperature of 25° C. to produce an ingot.

Subsequently, this ingot was subjected to a thermal treatment by being maintained under an argon gas atmosphere at a temperature of 1000° C. for 10 hours. Then, the ingot was pulverized mechanically under an argon gas atmosphere to obtain a rare earth-Mg—Ni-based hydrogen storage alloy powder. The volume average particle size (MV) of the rare earth-Mg—Ni-based hydrogen storage alloy powder obtained was measured by a laser diffraction-scattering particle size distribution analyzer. As a result, the volume average particle size (MV) was 60 μm.

The composition of this hydrogen storage alloy powder was analyzed by inductively coupled high-frequency plasma spectroscopy (ICP) to find that the composition was $Nd_{0.89}Mg_{0.11}Ni_{3.33}Al_{0.17}$.

To 100 parts by mass of the hydrogen storage alloy powder obtained were added 0.2 parts by mass of a sodium polyacrylate powder, 0.04 parts by mass of a carboxymethyl cellulose powder, 3.0 parts by mass of a dispersion of styrene butadiene rubber, 0.5 parts by mass of a carbon black powder, and 22.4 parts by mass of water, and the mixture was kneaded under an environment of 25° C. to prepare a negative electrode mixture paste.

This negative electrode mixture paste was packed into a foam nickel sheet having an areal density (basis weight) of about 250 g/m² and a thickness of about 0.6 mm and dried to obtain a foam nickel sheet packed with the negative electrode mixture. The sheet obtained was rolled to increase the alloy content per volume, and cut to a size of 40 mm in length and 40 mm in width to thereby obtain a negative electrode 21. The negative electrode 21 had a thickness of 0.25 mm.

Next, the negative electrode 21 obtained was subjected to an activation treatment. The procedure of this activation treatment is described below.

First, a common sintered nickel hydroxide positive electrode was provided. Note that, as this nickel hydroxide positive electrode, provided was one having a positive electrode capacity sufficiently larger than the negative electrode capacity of the negative electrode 21. Then, this nickel hydroxide positive electrode and the negative electrode 21 obtained were stacked with a separator formed of polyethylene non-woven fabric interposed therebetween to form an electrode group for an activation treatment. This electrode group for an activation treatment, along with a predetermined amount of an alkali electrolyte solution, was accommodated in a container made of an acrylic resin. Thereby, a single electrode cell for a nickel hydride secondary battery was formed.

As an initial charge and discharge operation, this single electrode cell was left to stand under an environment at a temperature of 25° C. for 5 hours, then charged at 0.1 It for 14 hours, and then discharged at 0.5 It until the battery voltage reached 0.70 V. Next, as a second charge and discharge operation, the cell was charged at 0.5 It for 2.8 hours under an environment at a temperature of 25° C. and then discharged at 0.5 It until the battery voltage reached 0.70 V. The second charge and discharge operation described above was taken as one cycle. In the second and later operations, the negative electrode 21 was subjected to an activation treatment by performing this charge and discharge cycle in a plurality of times. In each charge and discharge cycle, the capacity of the single electrode cell was determined. Then, the maximum value of the capacities obtained was taken as the capacity of the negative electrode. The negative electrode had a capacity of 640 mAh.

Thereafter, the single electrode cell was charged at 0.5 It for 2.8 hours and then, the negative electrode 21 was removed from the single electrode cell. In this manner, obtained was a negative electrode 21 subjected to the activation treatment and charging.

(4) Production of Air Hydrogen Secondary Battery

The air electrode 23 and the negative electrode 21 obtained were stacked with a separator 22 sandwiched therebetween to produce an electrode group 20. The separator 22 used for the production of this electrode group 20 was formed of non-woven fabric made of polypropylene fiber having a sulfone group and had a thickness of 0.1 mm (basis weight 53 g/m²).

Meanwhile, as a water-repellent venting member 50, provided was a composite forming by stacking non-woven fabric diffusion paper on a PTFE porous film. Here, the dimensions of the PTFE porous film were 45 mm in length, 45 mm in width, and 0.1 mm in depth. The dimensions of the non-woven fabric diffusion paper were 40 mm in length, 40 mm in width, and 0.2 mm in depth.

The composite as the water-repellent venting member 50 described above was mounted on the air electrode 23 in the electrode group 20 described above and accommodated in the battery case 10. In detail, the electrode group 20 onto which the composite, as the water-repellent venting member 50, was mounted was sandwiched between the wall opposed to air electrode 16 of an air electrode-side case half 12 and the negative electrode-side opposed wall 26 of an negative electrode-side case half 14 as well as the four ends of the separator 22 was sandwiched between the tip 19 of the air electrode-side outer peripheral wall 18 of the air electrode-side case half 12 and the tip 29 of the negative electrode-side outer peripheral wall 28 of the negative electrode-side case half 14 to thereby fix the electrode group 20. Here, the gap between the tip 19 of the air electrode-side outer peripheral wall 18 of the air electrode-side case half 12 and the tip 29 of the negative electrode-side outer peripheral wall 28 of the negative electrode-side case half 14 was sealed with a packing 34 such that the alkali electrolyte solution 32 did not leak from the ends of the separator 22 to outside the battery case 10.

Here, as a recessed groove 63, a recessed groove 63 in a serpentine shape of 1 mm in width, 1 mm in depth, and 1 mm ridge width is provided on the wall opposed to air electrode 16 of the air electrode-side case half 12. The recessed groove 63 has a total length of 720 mm. Then, a first vent 61 is provided at one end of this recessed groove 63, and a second vent 62 is provided at the other end. This recessed groove 63 is open on the side of water-repellent venting member 50. Further, a pressure pump 74 was attached via a piping member 72 to the first vent 61 described above.

In the negative electrode-side case half 14, an electrolyte solution storage 30 is also attached via a connecting portion 40 to a portion of the negative electrode-side outer peripheral wall 28. Into this electrolyte solution storage 30, a 5 mol/L KOH aqueous solution was poured as the alkali electrolyte solution 32. Note that the amount of the KOH aqueous solution poured at this time was 50 mL.

In the manner described above, a battery 1 was produced, as shown in FIGS. 1 and 2. The battery 1 obtained was left to stand under an environment at a temperature of 25° C. for an hour to allow the alkali electrolyte solution to permeate the electrode group 20.

Note that an air electrode lead (not shown) is electrically connected to the air electrode 23 and a negative electrode lead (not shown) is electrically connected to the negative electrode 21. These air electrode lead and negative electrode lead appropriately extend from the inner side to the outside of the battery case 10 while air-tightness and water-tightness of the battery case 10 is maintained. Additionally, an air electrode terminal (not shown) is attached to the tip of the air electrode lead, and a negative electrode terminal (not shown) is attached to the tip of the negative electrode lead.

Example 2

An air hydrogen secondary battery was produced in the same manner as in Example 1 except that the content of the bismuth-ruthenium oxide powder was 18 parts by mass and the content of the $\gamma$-$MnO_2$ powder was 2 parts by mass. In Example 2, the amount of the bismuth-ruthenium oxide powder (pyrochlore-type composite oxide catalyst) was 0.31 g.

Example 3

An air hydrogen secondary battery was produced in the same manner as in Example 1 except that the content of bismuth-ruthenium oxide powder was 16 parts by mass and the content of $\gamma$-$MnO_2$ powder was 4 parts by mass. In Example 3, the amount of the bismuth-ruthenium oxide powder (pyrochlore-type composite oxide catalyst) was 0.27 g.

Example 4

An air hydrogen secondary battery was produced in the same manner as in Example 1 except that the content of the bismuth-ruthenium oxide powder was 10 parts by mass and the content of $\gamma$-$MnO_2$ powder was 10 parts by mass. In Example 4, the amount of the bismuth-ruthenium oxide powder (pyrochlore-type composite oxide catalyst) was 0.16 g.

Example 5

An air hydrogen secondary battery was produced in the same manner as in Example 1 except that $\beta$-$MnO_2$, which was obtained by heating the $\gamma$-$MnO_2$ described above produced by an electrolysis method in air to 450° C. and calcining the $\gamma$-$MnO_2$ while the $\gamma$-$MnO_2$ was maintained at this temperature for 7 hours, was used instead of the $\gamma$-$MnO_2$ and the content of this $\beta$-$MnO_2$ powder added was 1 part by mass. In Example 5, the amount of the bismuth-ruthenium oxide powder (pyrochlore-type composite oxide catalyst) was 0.34 g.

Example 6

An air hydrogen secondary battery was produced in the same manner as in Example 1 except that $Mn_3O_4$ produced by a chemical synthesis method was used instead of the $\gamma$-$MnO_2$ described above and the content of this $Mn_3O_4$ powder added was 1 part by mass. In Example 6, the amount of the bismuth-ruthenium oxide powder (pyrochlore-type composite oxide catalyst) was 0.34 g.

Comparative Example 1

An air hydrogen secondary battery was produced in the same manner as in Example 1 except that no manganese dioxide powder was added and the content of the bismuth-ruthenium oxide powder was 20 parts by mass. In Comparative Example 1, the amount bismuth-ruthenium oxide powder (pyrochlore-type composite oxide catalyst) was 0.35 g.

Comparative Example 2

An air hydrogen secondary battery was produced in the same manner as in Example 1 except that no bismuth-ruthenium oxide powder was added and the content of $\gamma$-$MnO_2$ powder was 20 parts by mass. In Comparative Example 2, the amount of the bismuth-ruthenium oxide powder (pyrochlore-type composite oxide catalyst) was 0 g.

2. Evaluation of Air Hydrogen Secondary Batteries (1) Discharge Intermediate Voltage For the air hydrogen secondary batteries of Examples 1 to 6 and Comparative Examples 1 and 2, charging via the air electrode terminal and the negative electrode terminal at 0.5 It for 1.2 hours and discharging at 0.5 It to a battery voltage of 0.4 V were taken as one cycle, and the charging and discharging was repeated in 10 cycles. At this time, irrespective of charging or discharging, a pressure pump 74 supplies air from the first vent 61, and a venting passage 60 was continuously provided with air at a rate of 53 mL/minute. Note that the negative electrode capacity (640 mAh) was 1 It.

Then, the discharge capacity was measured at each cycle, and the battery voltage when the value of the discharge capacity reached the half value of the total discharge capacity was determined as an intermediate voltage. Of intermediate voltages obtained, the value of the tenth cycle was shown as the discharge intermediate voltage in Table 1.

TABLE 1

|  | Manganese oxide type | Mass ratio of manganese oxide [%] | Mass ratio of $Bi_2Ru_2O_7$ [%] | Discharge intermediate voltage [V] |
| --- | --- | --- | --- | --- |
| Example 1 | $\gamma$-$MnO_2$ | 5 | 95 | 0.830 |
| Example 2 | $\gamma$-$MnO_2$ | 10 | 90 | 0.837 |
| Example 3 | $\gamma$-$MnO_2$ | 20 | 80 | 0.838 |
| Example 4 | $\gamma$-$MnO_2$ | 50 | 50 | 0.810 |
| Example 5 | $\beta$-$MnO_2$ | 5 | 95 | 0.827 |
| Example 6 | $Mn_3O_4$ | 5 | 95 | 0.811 |
| Comparative Example 1 | Not applicable | 0 | 100 | 0.774 |
| Comparative Example 2 | $\gamma$-$MnO_2$ | 100 | 0 | Not dischargeable |

(2) Discussion

The air hydrogen secondary battery of Comparative Example 1, containing no manganese oxide in the air electrode mixture, had a discharge intermediate voltage of 0.774 V.

Meanwhile, the air hydrogen secondary batteries of Examples 1 to 6, containing both the manganese oxide and $Bi_2Ru_2O_7$ in the air electrode mixture, each had a discharge intermediate voltage from 0.810 to 0.838 V.

Thus, it can be seen that, the air hydrogen secondary batteries of Examples 1 to 6 each have increase in the discharge intermediate voltage and reduction in overvoltage on discharging in comparison with the air hydrogen secondary battery of Comparative Example 1. In other words, it can be said that addition of a manganese oxide can provide an effect of reducing overvoltage on discharging.

Conceivably, this is because the manganese oxide decomposes $HO_2^-$, as the intermediate product in the discharge reaction. In detail, even when no carbon is contained in the air electrode, $HO_2^-$ is generated in the pyrochlore-type composite oxide catalyst. This tendency becomes marked particularly on high rate discharging. However, when a manganese oxide, along with the pyrochlore-type composite oxide, is dispersed in the air electrode mixture, if $HO_2^-$ is generated, the manganese oxide can decompose the $HO_2^-$. It is conceived that this is because increase in overvoltage due to generation of $HO_2^-$ can be inhibited.

The air hydrogen secondary batteries of Examples 2 and 3 each had a discharge intermediate voltage of 0.837 V and 0.838 V, and particularly, the overvoltage has been reduced. For this reason, it can be said that the ratio between the manganese oxide and $Bi_2Ru_2O_7$ is preferably set to 10:90 to 20:80.

From the results of Example 1, Example 5, and Example 6, with respect to the type of manganese oxides, it can be said that $\gamma$-$MnO_2$ produced by an electrolysis method and $\beta$-$MnO_2$ obtained by calcining the $\gamma$-$MnO_2$ have no significant difference in the effect of reducing overvoltage, and are equivalent in their properties. Meanwhile, it can be said that $Mn_3O_4$ produced by a chemical synthesis method is slightly inferior in its properties.

Accordingly, it can be said that $\gamma$-$MnO_2$ produced by an electrolysis method or a manganese oxide obtained by calcining the $\gamma$-$MnO_2$, for example, $\beta$-$MnO_2$ is more preferably selected as the manganese oxide.

The air hydrogen secondary battery of Comparative Example 2 containing no $Bi_2Ru_2O_7$ could not be discharged at all.

Accordingly, it can be said that the pyrochlore-type composite oxide ($Bi_2Ru_2O_7$) is essential.

Note that the present invention is not limited to the embodiment and examples described above. Examples of catalysts for an air secondary battery include oxides of selectable elements exemplified by the general formula representing the composition of the pyrochlore-type composite oxide described above, in addition to the bismuth-ruthenium oxide. Additionally, the present invention is not limited to air hydrogen secondary batteries, and may be applied to other air secondary batteries including Zn, Al, Mg, or Li as a metal for use in the negative electrode. Such other air secondary batteries can achieve an effect similar to that of air hydrogen secondary batteries.

ASPECTS OF PRESENT DISCLOSURE

According to a first aspect of the present disclosure, provided is an air electrode for an air secondary battery, including an air electrode mixture containing a pyrochlore-type composite oxide and a manganese oxide, wherein the pyrochlore-type composite oxide has a composition represented by the general formula: $A_{2-x}B_{2-y}O_{7-z}$, wherein x, y, and z each represent a numerical value of 0 or more and 1 or less, A represents at least one element selected from Bi, Pb, Tb, La, Ce, Pr, Nd, Pm, Sm, Eu, Gd, Dy, Ho, Er, Tm, Yb, Lu, Mn, Y, Zn, and Al, and B represents at least one element selected from Ru, Ir, Si, Ge, Ta, Sn, Hf, Zr, Ti, Nb, V, Sb, Rh, Cr, Re, Sc, Co, Cu, In, Ga, Cd, Fe, Ni, W, and Mo.

A second aspect of the present disclosure is the air electrode for an air secondary battery according to the first aspect of the present disclosure described above, wherein relations of Q+R=100%, 5%≤Q≤50%, and 50%≤R≤95% are satisfied where Q represents the mass ratio of the manganese oxide and R represents the mass ratio of the pyrochlore-type composite oxide.

A third aspect of the present disclosure is the air electrode for an air secondary battery according to the second aspect of the present disclosure described above, wherein the Q and the R satisfy relations of Q+R=100%, 10%≤Q≤20%, and 80%≤R≤90%.

A fourth aspect of the present disclosure is the air electrode for an air secondary battery according to any of the first aspect to the third aspect of present disclosure described above, wherein the air electrode mixture contains 60% by mass or more of a nickel powder.

A fifth aspect of the present disclosure is the air electrode for an air secondary battery according to any of the first aspect to the fourth aspect of the present disclosure described above, wherein the manganese oxide is at least one of $MnO_2$, $Mn_2O_3$, and $Mn_3O_4$.

A sixth aspect of the present disclosure is the air electrode for an air secondary battery according to the fifth aspect of the present disclosure described above, wherein the $MnO_2$ includes at least one of $\alpha$-$MnO_2$, $\beta$-$MnO_2$, $\gamma$-$MnO_2$, $\lambda$-$MnO_2$, and $\delta$-$MnO_2$, and the $Mn_2O_3$ includes at least one of $\alpha$-$Mn_2O_3$ and $\gamma$-$Mn_2O_3$.

A seventh aspect of the present disclosure is an air secondary battery, including an electrode group including an air electrode and a negative electrode stacked with a separator therebetween, and a container accommodating the electrode group along with an alkali electrolyte solution, wherein the air electrode includes the air electrode for an air secondary battery according to any of the first aspect to the sixth aspect described above.

An eighth aspect of the present disclosure is air secondary battery according to the seventh aspect of the present disclosure described above, wherein the negative electrode includes a hydrogen storage alloy.

The air electrode for an air secondary battery according to the present disclosure can reduce overvoltage in a discharge reaction. Thus, an air secondary battery including the air electrode has improved energy efficiency and high output. For this reason, according to the present disclosure, it is possible to provide an air electrode for an air secondary battery capable of reducing overvoltage in a discharge reaction, and an air secondary battery including this air electrode and capable of improving the energy efficiency and achieving higher output.

Embodiments of the present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air electrode for an air secondary battery, comprising an air electrode mixture containing a pyrochlore-type composite oxide and a manganese oxide, wherein:
the pyrochlore-type composite oxide has a composition represented by the general formula: $A_{2-x}B_{2-y}O_{7-z}$, wherein x, y, and z each represent a numerical value of 0 or more and 1 or less, A represents at least one element selected from the group consisting of Bi, Pb, Tb, La, Ce, Pr, Nd, Pm, Sm, Eu, Gd, Dy, Ho, Er, Tm, Yb, Lu, Mn, Y, Zn, and Al, and B represents at least one element selected from the group consisting of Ru, Ir, Si, Ge, Ta, Sn, Hf, Zr, Ti, Nb, V, Sb, Rh, Cr, Re, Sc, Co, Cu, In, Ga, Cd, Fe, Ni, W, and Mo; and
relations of Q+R=100%, 5%≤Q≤50%, and 50%≤R≤95% are satisfied, where Q represents the mass ratio of the manganese oxide and R represents the mass ratio of the pyrochlore-type composite oxide relative to each other.

2. The air electrode for an air secondary battery according to claim 1, wherein relations of Q+R=100%, 10%≤Q≤20%, and 80%≤R≤90% are satisfied.

3. The air electrode for an air secondary battery according to claim 1, wherein the air electrode mixture further comprises a conductive material comprising a nickel powder, and wherein the air electrode mixture comprises 60-80% by mass of the nickel powder, with 20-40% by mass of the air electrode mixture comprising the pyrochlore-type composite oxide, the manganese oxide and a binder.

4. The air electrode for an air secondary battery according to claim 1, wherein the manganese oxide is at least one of $MnO_2$, $Mn_2O_3$, or $Mn_3O_4$.

5. The air electrode for an air secondary battery according to claim 4, wherein the manganese oxide is at least one of:
$MnO_2$ comprising at least one of α-$MnO_2$, β-$MnO_2$, γ-$MnO_2$, λ-$MnO_2$, or δ-$MnO_2$, or
$Mn_2O_3$ comprising at least one of α-$Mn_2O_3$ or γ-$Mn_2O_3$.

6. An air secondary battery comprising:
an electrode group comprising an air electrode and a negative electrode stacked with a separator therebetween, and
a container accommodating the electrode group along with an alkali electrolyte solution,
wherein the air electrode comprises the air electrode for an air secondary battery according to claim 1, and
wherein the negative electrode comprises a hydrogen storage alloy.

* * * * *